United States Patent
Tomiyasu et al.

(10) Patent No.: US 7,833,641 B2
(45) Date of Patent: Nov. 16, 2010

(54) MAGNETIC DISK

(75) Inventors: Hiroshi Tomiyasu, Shinjuku-ku (JP);
Koichi Shimokawa, Shinjuku-ku (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/161,626

(22) PCT Filed: Jan. 22, 2007

(86) PCT No.: PCT/JP2007/050886

§ 371 (c)(1),
(2), (4) Date: Jul. 21, 2008

(87) PCT Pub. No.: WO2007/083792

PCT Pub. Date: Jul. 26, 2007

(65) Prior Publication Data

US 2009/0023017 A1    Jan. 22, 2009

(30) Foreign Application Priority Data

Jan. 23, 2006    (JP) ............................... 2006-013614

(51) Int. Cl.
*G11B 5/66* (2006.01)
(52) U.S. Cl. .................................... 428/835.8; 508/422
(58) Field of Classification Search ........................ None
See application file for complete search history.

(56) References Cited

U.S. PATENT DOCUMENTS

| | | | | |
|---|---|---|---|---|
| 6,730,403 | B1 * | 5/2004 | Shirai et al. .............. | 428/833.5 |
| 7,252,897 | B2 * | 8/2007 | Shimokawa et al. ........ | 428/833 |
| 7,277,254 | B2 * | 10/2007 | Shimokawa et al. ........ | 360/135 |
| 2003/0179490 | A1 | 9/2003 | Matsumoto et al. | |
| 2004/0080864 | A1 | 4/2004 | Nakakawaji et al. | |
| 2006/0229217 | A1 * | 10/2006 | Liu et al. .................... | 508/422 |
| 2008/0020171 | A1 * | 1/2008 | Wakabayashi et al. ..... | 428/65.8 |

FOREIGN PATENT DOCUMENTS

| | | |
|---|---|---|
| JP | 62-66417 A | 3/1987 |
| JP | 2000-260017 A | 9/2000 |
| JP | 2000-311332 A | 11/2000 |

(Continued)

OTHER PUBLICATIONS

Kasai et al., "Z-dol versus Z-tetral: Bonding and durability in magnetic hard disk application", Feb. 2004, Tribology Letters, vol. 16, Nos. 1-2, pp. 29-36.*

(Continued)

*Primary Examiner*—Holly Rickman

(57) ABSTRACT

Disclosed is a magnetic disk which has a lubricant layer with excellent heat resistance and high adhesiveness and is free from fly-stiction failure or corrosion failure even at an extremely low flying height of 10 nm or lower. Also disclosed is a magnetic disk which has a lubricant layer with good thermal properties and can exert a stable action over a wide temperature range. The magnetic disk comprises a substrate (1), and a magnetic layer (3), a carbon-containing protective layer (4) and a lubricant layer (5) provided on the substrate (1), wherein the lubricant layer (5) contains a magnetic disk lubricant comprising a compound having a phosphazene ring and two or more hydroxyl and/or carboxyl groups in the molecule.

3 Claims, 1 Drawing Sheet

10 MAGNETIC DISK

5 LUBRICATING LAYER
4 CARBON-BASED PROTECTIVE LAYER
3 MAGNETIC LAYER
2b UNDER-LAYER ⎫
2a ADHESIVE LAYER ⎬ 2 NON-MAGNETIC METAL LAYER
1 SUBSTRATE

FOREIGN PATENT DOCUMENTS

| | | |
|---|---|---|
| JP | 2003-217110 A | 7/2003 |
| JP | 2004-152460 A | 5/2004 |
| JP | 2006-70173 A | 3/2006 |
| JP | 2006-307123 A | 11/2006 |
| SG | 200608332-3 | 1/2006 |
| WO | 2006/090957 A1 | 1/2006 |

OTHER PUBLICATIONS

English abstract of WO 2006/009057, Jan. 2006.*
Singapore Office Action corresponding to Singapore Patent Application No. 200805319-1, dated Dec. 10, 2009.

* cited by examiner

MAGNETIC DISK

TECHNICAL FIELD

This invention relates to a magnetic disk adapted to be mounted in a magnetic disk apparatus such as a hard disk drive.

BACKGROUND ART

Magnetic disk apparatuses such as a hard disk drive (HDD) have employed a CSS (Contact Start and Stop) system in which a magnetic head is held in contact with a contact sliding region (CSS region) provided in an inner peripheral region on the surface of a magnetic disk while the apparatus is stopped, then at the time of start-up, the magnetic head is flown up while sliding in contact with the disk surface in the CSS region and then recording/reproduction is carried out on the surface of a recording/reproducing disk region provided outside the CSS region. In a finishing operation, the magnetic head is retreated from the recording/reproducing region to the CSS region and then is landed while sliding in contact with the disk surface in the CSS region so as to be stopped. In the CSS system, the start-up operation and the finishing operation where the contact sliding occurs are called CSS operations.

In such a CSS-system magnetic disk, it is necessary to provide both the CSS region and the recording/reproducing region on the disk surface. Further, in order to prevent adsorption between the magnetic head and the magnetic disk while they are in contact with each other, it is necessary to provide a convex-concave shape having a certain surface roughness on the surface of the magnetic disk.

In order to suppress damage due to the contact sliding between the magnetic head and the magnetic disk during the CSS operations, there is known a magnetic recording medium or the like coated with a perfluoroalkylpolyether lubricant having a structure of $HOCH_2-CF_2O-(C_2F_4O)_p-(CF_2O)_q-CH_2OH$ according to Japanese Unexamined Patent Application Publication (JP-A) No. S62-66417 (Patent Document 1) or the like, for example.

Further, Japanese Unexamined Patent Application Publication (JP-A) No. 2000-311332 (Patent Document 2) discloses a magnetic recording medium coated with a lubricant in a combination of a cyclic triphosphazene-based lubricant and a perfluoropolyether-based lubricant, that can improve the lubricating properties and the CSS properties without decomposing the lubricant even when a low-flying magnetic head is used. Further, Japanese Unexamined Patent Application Publication (JP-A) No. 2004-152460 (Patent Document 3) discloses a magnetic disk with a highly adhesive lubricating layer that can stably operate even in the case of a very low flying height and that can suppress migration, using a lubricant in a combination of a perfluoropolyether compound having a phosphazene ring as a terminal group and a perfluoropolyether compound having a hydroxyl group as a terminal group.

Patent Document 1: Japanese Unexamined Patent Application Publication (JP-A) No. S62-66417
Patent Document 2: Japanese Unexamined Patent Application Publication (JP-A) No. 2000-311332
Patent Document 3: Japanese Unexamined Patent Application Publication (JP-A) No. 2004-152460

DISCLOSURE OF THE INVENTION

Problem to be Solved by the Invention

Recently, LUL (Load Unload)-system magnetic disk apparatuses are being introduced in place of the CSS-system ones. In the LUL system, a magnetic head is retreated to an inclined platform called a ramp located outside a magnetic disk while the apparatus is stopped. Then at the time of start-up, the magnetic head is caused to slide from the ramp, after the magnetic disk starts to rotate, so as to fly over the magnetic disk to perform recording/reproduction. This sequence of operations is called an LUL operation. In the LUL system, as compared with the CSS system, a wider recording/reproducing region can be ensured on the surface of the magnetic disk, which is thus preferable for increasing the information capacity. Further, since it is not necessary to provide the convex-concave shape for CSS on the surface of the magnetic disk, it is possible to significantly smooth the surface of the magnetic disk. Consequently, the flying height of the magnetic head can be further reduced. Therefore, it is possible to increase the S/N ratio of a recording signal, which is thus preferable.

Because of the significant reduction in magnetic head flying height following the introduction of the LUL system, it has become required that a magnetic disk stably operate even in the case of a low flying height of 15 nm or less. However, when a magnetic head is flown over the surface of the magnetic disk at such a low flying height, there has arisen a problem that fly stiction failure, head corrosion failure, or the like frequently occurs.

The fly stiction failure is a failure in which the flying posture or the flying height of a magnetic head goes out of order while it is flying, followed by irregular reproduction output changes. Depending on circumstances, a magnetic disk and a magnetic head may be brought into contact with each other during flying to cause a head crash failure.

The corrosion failure is a failure in which an element portion of a magnetic head is subjected to corrosion to cause a trouble in recording/reproduction. Depending on circumstances, recording/reproduction may be disabled or a corroded element may expand to cause damage to the surface of a magnetic disk while flying.

The present inventors have got knowledge that the occurrence of the foregoing failures becoming noticeable in recent magnetic disks may be resulted from the occurrence of the following mechanism.

When the flying height of a magnetic head becomes a low flying height of 15 nm or less, the magnetic head repeatedly exerts adiabatic compression and adiabatic expansion on a lubricating layer on the surface of a magnetic disk through air molecules while flying. Consequently, the lubricating layer tends to be repeatedly subjected to heating and cooling. Therefore a reduction in molecular weight of a lubricant forming the lubricating layer tends to be promoted. If the molecular weight of the lubricant is reduced, its fluidity increases so that its adhesion to a protective layer decreases. It is considered that the lubricant with the increased fluidity is transferred and deposited on the magnetic head located in an extremely close positional relationship to make its flying posture unstable to thereby cause the fly stiction failure. Particularly, a recently introduced magnetic head with an NPAB (negative pressure) slider is considered to facilitate the transfer deposition phenomenon because it tends to suck the lubricant due to a strong vacuum created at a bottom surface of the magnetic head. The transferred lubricant may produce acid such as hydrofluoric acid to thereby corrode an element portion of the magnetic head. Particularly, a head mounted with a magnetoresistive effect element tends to be corroded.

Further, the present inventors have got knowledge that the LUL system facilitates the occurrence of these failures. It has been found out that, in the case of the LUL system, as opposed to the case of the CSS system, a magnetic head does not contact-slide on the surface of a magnetic disk and, thus, it is difficult for a lubricant once transferred and deposited on the magnetic head to be removed by transfer to the magnetic disk side. It is considered that, in the case of the conventional CSS system, a lubricant transferred onto a magnetic head tends to be cleaned off by its contact sliding on a CSS region of a magnetic disk and, therefore, these failures are not actualized.

Recently, in order to increase the response speed of a magnetic disk apparatus, the rotation speed of a magnetic disk is increased. The rotation speed of a small-diameter 2.5-inch magnetic disk apparatus suitable for mobile applications was conventionally about 4200 rpm, while, recently, the response characteristics are enhanced by rotating it at a high speed of 5400 rpm or more. If the magnetic disk is rotated at such a high speed, a phenomenon is actualized in which a lubricating layer moves (migrates) due to a centrifugal force caused by the rotation so that the thickness of the lubricating layer becomes nonuniform in the plane of the magnetic disk.

Further, because of a significant reduction in magnetic head flying height (10 nm or less) following the increase in recording density in recent years, a possibility becomes high that contact or friction between a magnetic head and the surface of a magnetic disk frequently occurs. When the magnetic head is brought in contact with the surface of the magnetic disk, there occurs a case where the magnetic head does not immediately go out of contact with the surface of the magnetic disk, but slides with friction for a while. Further, because of recording/reproduction performed by the high-speed rotation of a magnetic disk in recent years as described above, heat due to contact or friction is generated more than conventional. Therefore, it is concerned that a possibility becomes higher than conventional that a material of a lubricating layer on the surface of the magnetic disk is thermally decomposed due to the generation of heat, so that data read/write is subjected to failure due to adhesion, to a magnetic head, of a lubricant thermally decomposed, reduced in molecular weight, and increased in fluidity. Further, in consideration of data recording/reproduction in the state where a magnetic head and a magnetic disk are in contact with each other in near future, an influence of heat generation due to the constant contact is further concerned.

Taking this situation into account, it is desired that heat resistance required for a lubricating layer be further improved. Generally, it is known that the heat resistance can be improved by increasing the molecular weight of a material used therefor. However, for example, when the molecular weight is increased by increasing the length of the main chain of a perfluoropolyether-based compound generally used as a lubricant conventionally, there has been a problem that the fly stiction failure, the head corrosion failure, or the like tends to occur and thus the reliability of a magnetic disk is low. The reason is considered to be that when a lubricating layer is formed on a protective layer, long perfluoropolyether main chain portions cover the surface of the protective layer to reduce a possibility that hydroxyl groups at terminals are disposed on the surface of the protective layer and thus the adhesion to the protective layer is weakened.

Further, as disclosed in the foregoing Patent Document 2 or Patent Document 3, it has also been proposed to enhance the heat resistance by using a mixture obtained by adding a material with heat resistance such as a phosphazene-based compound to a conventional perfluoropolyether-based lubricant. However, according to a study by the present inventors, when such a material with heat resistance and the perfluoropolyether-based lubricant are mixed and used, even if the material with heat resistance is caused to be contained in large amount for increasing heat resistance, required for a lubricating layer, more than conventional, the perfluoropolyether-based lubricant preferentially adheres to the surface of the protective layer upon forming the lubricating layer on the protective layer. Thus, the material with heat resistance has difficulty in adhering to the surface of a magnetic disk. Therefore, improvement in heat resistance is not observed much.

Recently, a magnetic disk apparatus is mounted in a car navigation system. However, for example, even in Japan, there are a region where the temperature drops to about −20° C. in the winter season, for example, and a region where the temperature rises to about 30 to 45° C. in the summer season, for example. Therefore, a magnetic disk to be loaded in such a magnetic disk apparatus for the car navigation system is required to stably operate without failure over the wide temperature range described above. For this purpose, the viscosity of a lubricant is required not to largely change even in the wide temperature range.

The lubrication technique described in the foregoing Patent Document 1, which has been conventionally used, was developed mainly aiming at improving the CSS operations. If used for LUL-system magnetic disks, the frequency of occurrence of the foregoing failures is high. Therefore, it has already been difficult to satisfy reliability required for recent magnetic disks. Further, if the phosphazene-based compound and the perfluoropolyether-based lubricant are mixed and used as described in the foregoing Patent Document 2 or Patent Document 3, there is a problem that the foregoing failures tend to occur depending on the temperature condition where a magnetic disk is used. Therefore, high reliability cannot be obtained over the usable wide temperature range.

Under these circumstances, objects of this invention are firstly to provide a magnetic disk having a lubricating layer with excellent heat resistance and high adhesion and capable of preventing the fly stiction failure, the corrosion failure, or the like even in the case of a very low flying height of 10 nm or less, secondly to provide a magnetic disk having a lubricating layer with good thermal properties and adapted to exhibit stable operation under wide temperature conditions, and thirdly to provide a magnetic disk particularly suitable for the LUL (Load Unload) system.

Means for Solving the Problem

The present inventors have discovered that the foregoing problems can be solved by the following inventions and have completed this invention.

Specifically, this invention has each of the following structures.

(Structure 1) A magnetic disk having a magnetic layer, a carbon-based protective layer, and a lubricating layer over a substrate, wherein:

the lubricating layer contains a magnetic disk lubricant comprising a compound having a phosphazene ring and two or more hydroxyl and/or carboxyl groups (if a group having a hydroxyl group is bonded to one of bonds of the phosphazene ring, the compound has three or more hydroxyl groups) in one molecule.

(Structure 2) A magnetic disk according to structure 1, wherein the magnetic disk lubricant has a perfluoropolyether main chain represented by $-(O-C_2F_4)m-(O-CF_2)n-$ (m and n are each an integer of 1 or more) in the molecule.

(Structure 3) A magnetic disk according to structure 1 or 2, wherein the magnetic disk lubricant has a hydroxyl group and/or a carboxyl group as terminal groups/a terminal group bonded, through the perfluoropolyether main chain, to at least one of bonds of the phosphazene ring.

(Structure 4) A magnetic disk having a magnetic layer, a carbon-based protective layer, and a lubricating layer over a substrate, wherein:

the lubricating layer contains a phosphazene compound represented by a general formula (I)

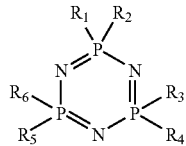

[Formula 1]

(in the formula, each of $R_1$ to $R_6$ is a fluorine-containing group, a hydroxyl group, or a carboxyl group, at least one of $R_1$ to $R_6$ is a group having —$(O-C_2F_4)$m-$(O-CF_2)$n- (m and n are each an integer of 1 or more) in a structure thereof and having a hydroxyl group and/or a carboxyl group at terminals/a terminal thereof, and the phosphazene compound has two or more hydroxyl and/or carboxyl groups in one molecule, while, if one of $R_1$ to $R_6$ is a group having —$(O-C_2F_4)$m-$(O-CF_2)$n- (m and n are each an integer of 1 or more) in a structure thereof and having a hydroxyl group at a terminal thereof, the phosphazene compound has three or more hydroxyl groups at terminals thereof).

(Structure 5) A magnetic disk according to structure 4, wherein a number-average molecular weight (Mn) of the phosphazene compound is 300 to 7000.

(Structure 6) A magnetic disk according to any one of structures 1 to 5, wherein:

the magnetic disk is adapted to be mounted in a magnetic disk apparatus of a load unload system.

Effect of the Invention

According to this invention, since a lubricating layer is formed using a magnetic disk lubricant comprising a compound having a phosphazene ring and two or more hydroxyl and/or carboxyl groups in one molecule, it is possible to provide a magnetic disk having the lubricating layer with excellent heat resistance and high adhesion and capable of preventing the fly stiction failure, the corrosion failure, or the like even in the case of a very low flying height of 10 nm or less.

Further, according to this invention, since a lubricating layer is formed using the above magnetic disk lubricant, the molecular weight of the lubricant is made large and thus the lubricating layer can have good thermal properties. Consequently, it is possible to provide a magnetic disk that exhibits stable operation under wide temperature conditions.

Further, according to this invention, it is possible to provide a magnetic disk particularly suitable for the LUL (Load Unload) system.

Figure 1:
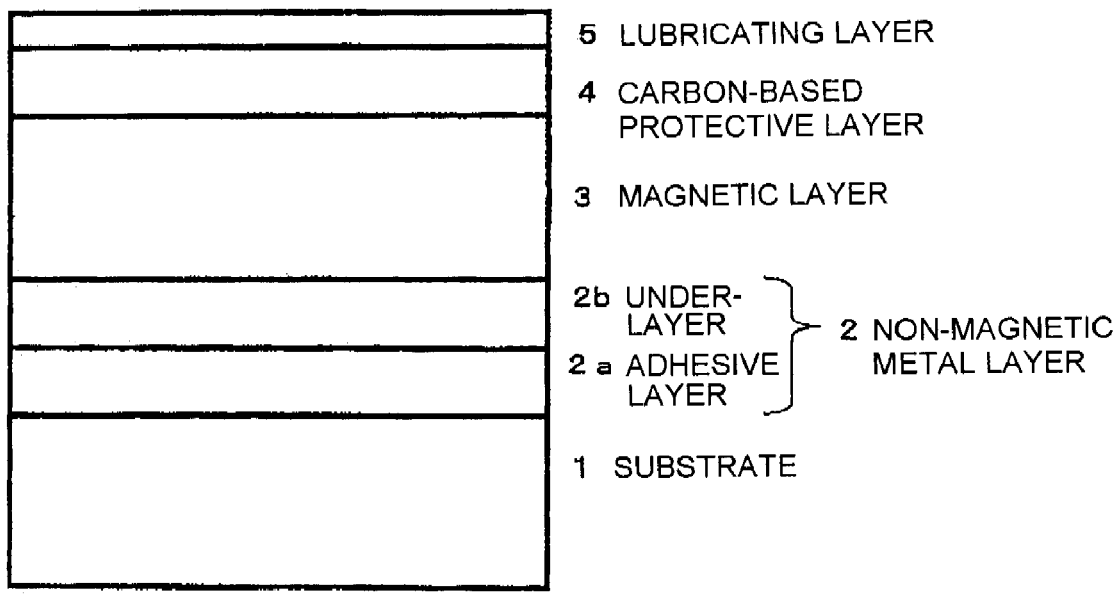
FIG. 1 is an exemplary sectional view of an embodiment of a magnetic disk of this invention.

DESCRIPTION OF SYMBOLS 10 magnetic disk
1 disk substrate
2a adhesive layer
2b underlayer
3 magnetic layer
4 protective layer
5 lubricating layer

BEST MODE FOR CARRYING OUT THE INVENTION

Hereinbelow, this invention will be described in detail according to an embodiment.

A magnetic disk of this invention is a magnetic disk having a magnetic layer, a carbon-based protective layer, and a lubricating layer over a substrate and characterized in that the lubricating layer contains a magnetic disk lubricant comprising a compound having a phosphazene ring and two or more hydroxyl and/or carboxyl groups in one molecule.

By the use of such a magnetic disk lubricant comprising a compound (hereinafter referred to as a "phosphazene compound of this invention") having a phosphazene ring and two or more hydroxyl and/or carboxyl groups in one molecule, since the phosphazene ring is present for increasing the molecular weight to thereby contribute to an improvement in heat resistance and, further, the hydroxyl group is present at a terminal in the same molecule as the phosphazene ring for increasing the adhesion to the protective layer, it is possible to form the lubricating layer having both functions of improved heat resistance and improved adhesion. This invention can solve the problem that when, as conventionally, a compound having a phosphazene ring and thus mainly provided with a function of heat resistance and a perfluoropolyether compound having a hydroxyl group as a terminal group and thus mainly provided with a function of adhesion are mixed and used, the perfluoropolyether compound preferentially adheres to the surface of a protective layer and thus the material with heat resistance has difficulty in adhering to the surface of a magnetic disk, and therefore, improvement in heat resistance is not observed much. If both hydroxyl and carboxyl groups are present in one molecule of the phosphazene compound of this invention, it is sufficient that the total number of the hydroxyl and carboxyl groups is two or more. In terms of improving the adhesion to the carbon-based protective layer, it is preferable that at least a hydroxyl group be present.

The phosphazene compound of this invention preferably has a structure having, in addition to the hydroxyl and/or carboxyl groups and the phosphazene ring, a perfluoropolyether main chain represented by —$(O-C_2F_4)$m-$(O-CF_2)$n- (m and n are each an integer of 1 or more) in the molecule. This is because the lubricating performance suitable as a magnetic disk lubricant can be obtained by including the above perfluoropolyether structure. Further, by adjusting the length of the perfluoropolyether main chain to an appropriate range, the molecular weight can be adjusted. For example, by increasing the length of the perfluoropolyether main chain within an appropriate range, the molecular weight can be increased to reduce a change in viscosity of the lubricant over a wide temperature range, thereby improving the thermal properties of the lubricant. The length of the perfluoropolyether main chain is not particularly limited, but if the length of the main chain is too short, there is a case where the lubricant tends to be evaporated or the good lubricating performance cannot be obtained, while, if the length of the main chain is too long, there is a case where although the molecular weight increases to contribute to an improvement in thermal properties, it is difficult for the hydroxyl group at the molecular terminal to be disposed on the surface of the protective layer and thus the adhesion is reduced. Therefore, it is preferable for this invention that m+n in the perfluoropolyether main chain be in the range of 2 to 80, preferably about 3 to 60.

Further, the phosphazene compound of this invention preferably has a structure having a hydroxyl group and/or a carboxyl group as terminal groups/a terminal group bonded, through the perfluoropolyether main chain, to at least one of bonds of the phosphazene ring. In this manner, with the structure in which one molecule has the phosphazene ring at its one terminal and the hydroxyl group and/or the carboxyl group at its other terminals/terminal through the perfluoropolyether main chain, the heat resistance, the adhesion, and the lubricating performance are all well exhibited, which is thus particularly preferable for this invention.

However, if a group having a hydroxyl group is bonded to one of bonds of the phosphazene ring in the phosphazene compound of this invention, the compound has three or more hydroxyl groups.

As the phosphazene compound of this invention, it is preferable to cite, for example, a phosphazene compound represented by a general formula (I).

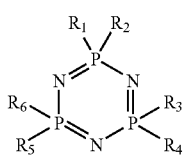

[Formula 2]

In the formula, each of $R_1$ to $R_6$ is a fluorine-containing group, a hydroxyl group, or a carboxyl group, at least one of $R_1$ to $R_6$ is a group having $—(O—C_2F_4)m-(O—CF_2)n-$ (m and n are each an integer of 1 or more) in a structure thereof and having a hydroxyl group and/or a carboxyl group at terminals/a terminal thereof, and the phosphazene compound has two or more hydroxyl and/or carboxyl groups in one molecule, while, if one of $R_1$ to $R_6$ is a group having $—(O—C_2F_4)m-(O—CF_2)n-$ (m and n are each an integer of 1 or more) in a structure thereof and having a hydroxyl group at a terminal thereof, the phosphazene compound has three or more hydroxyl groups at terminals thereof.

As the fluorine-containing group, $—OCH_2CF_3$ or the like is cited, for example. In the phosphazene compound represented by the general formula (I), the number of all hydroxyl and/or carboxyl groups in one molecule is two or more. However, for improving the adhesion to the protective layer, the number of hydroxyl and/or carboxyl groups in one molecule is preferably four or more and further preferably six or more.

Hereinbelow, illustrative compounds of the phosphazene compound represented by the general formula (I) will be cited, but this invention is not limited to those compounds.

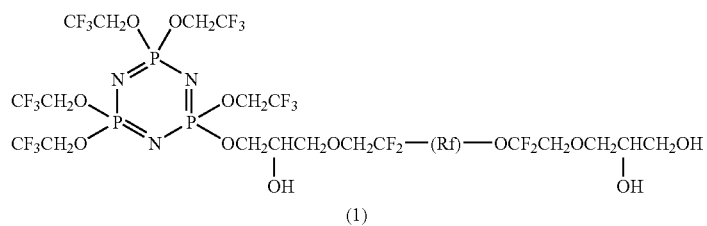

[Formula 3]

Rf: $—(OC_2F_4)m—(OCF_2)—$ (m, n = an integer of 1 or more)

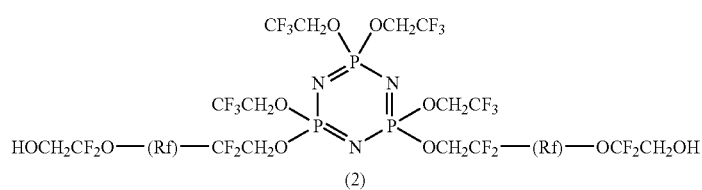

[Formula 4]

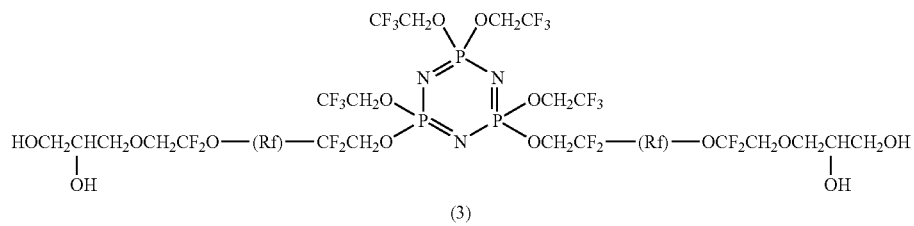

[Formula 5]

Rf: $—(OC_2F_4)m—(OCF_2)—$ (m, n = an integer of 1 or more)

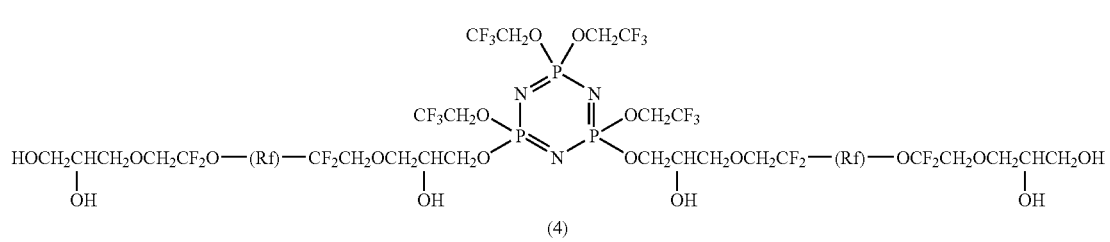

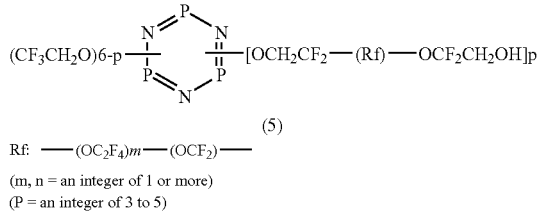

(5)

Rf: —(OC$_2$F$_4$)$m$—(OCF$_2$)—

(m, n = an integer of 1 or more)
(P = an integer of 3 to 5)

The molecular weight of the phosphazene compound of this invention is not particularly limited, but, for example, a number-average molecular weight (Mn) thereof measured using a nuclear magnetic resonance absorption (NMR) method is preferably in the range of 300 to 7000 and further preferably in the range of 500 to 6000. For example, by adjusting the length of the perfluoropolyether main chain in a molecule to an appropriate range so as to set the molecular weight of the phosphazene compound of this invention in the above range, the lubricating layer can have, in addition to good lubricating performance, high heat resistance that can prevent thermal decomposition even if heat is generated due to contact or friction with a magnetic head at a very low flying height and that can continue stable recording/reproduction without failure, and good adhesion to the protective layer and further can have good thermal properties over a wide temperature range.

In this invention, it is preferable that the molecular weight fractionation of the lubricant comprising the phosphazene compound of this invention be carried out by an appropriate method to thereby set the molecular weight dispersion (ratio of weight-average molecular weight (Mw)/number-average molecular weight (Mn)) to 1.3 or less.

In this invention, it is not necessary to particularly limit a method for molecular weight fractionation, but use can be made, for example, of molecular weight fractionation by a gel permeation chromatography (GPC) method, molecular weight fractionation by a supercritical fluid extraction method, or the like.

When forming the lubricating layer using the magnetic disk lubricant comprising the phosphazene compound of this invention, it can be formed by using a solution in which the lubricant is dispersed and dissolved in an appropriate solvent and coating the solution, for example, by a dipping method. As the solvent, use can be preferably made, for example, of a fluorine-based solvent (trade name Vertrel XF or the like manufactured by DuPont-Mitsui Fluorochemicals Co., Ltd.). A film forming method for the lubricating layer is, of course, not limited to the above dipping method and use may be made of a film forming method such as a spin coating method, a spray method, or a vapor coating method.

In this invention, for further improving the adhesion of the formed lubricating layer to the protective layer, the magnetic disk may be exposed to an atmosphere at 70° C. to 200° C. after the film formation. Since the phosphazene compound of this invention is excellent in heat resistance, there is no possibility of decomposition due to this heat treatment.

In this invention, the thickness of the lubricating layer is preferably set to 5 Å to 15 Å. If it is less than 5 Å, there is a case where the lubricating performance as the lubricating layer is lowered. If it exceeds 15 Å, there is a case where the fly stiction failure occurs and there is a case where the LUL durability is lowered.

As the protective layer in this invention, a carbon-based protective layer can be used. Particularly, an amorphous carbon protective layer is preferable. Such a protective layer has a high affinity to the phosphazene compound of this invention having a hydroxyl group as a terminal group and thus good adhesion can be obtained. The adhesion can be controlled by forming the carbon protective layer of hydrogenated carbon and/or carbon nitride and adjusting the content of hydrogen and/or nitrogen. The content of hydrogen is preferably set to 3 to 20 at % when measured by hydrogen forward scattering (HFS). The content of nitrogen is preferably set to 4 to 12 at % when measured by X-ray photoelectron spectroscopy (XPS).

When using the carbon-based protective layer in this invention, it can be formed, for example, by a DC magnetron sputtering method. It is also preferably an amorphous carbon protective layer formed by a plasma CVD method. Particularly, it is preferably an amorphous hydrogenated carbon protective layer formed by the plasma CVD method.

In this invention, the substrate is preferably a glass substrate. The glass substrate is rigid and excellent in smoothness and thus is suitable for an increase in recording density. As the glass substrate, an aluminosilicate glass substrate, for example, is cited and, particularly, a chemically strengthened aluminosilicate glass substrate is preferable.

In this invention, the main surface of the substrate is preferably ultra-smooth with Rmax of 6 nm or less and Ra of 0.6 nm or less. Rmax and Ra herein referred to are based on the JIS B0601 standard.

The magnetic disk of this invention comprises at least the magnetic layer, the protective layer, and the lubricating layer over the substrate. In this invention, the magnetic layer is not particularly limited and may be a magnetic layer for an in-plane recording system or a magnetic layer for a perpendicular recording system. Particularly, if it is a CoPt-based magnetic layer, high coercive force and high reproduction output can be achieved, which is thus preferable.

In the magnetic disk of this invention, an underlayer may be provided between the substrate and the magnetic layer if necessary. Further, an adhesive layer may be provided between the underlayer and the substrate. In this case, as the underlayer, a Cr layer, a CrMo, CrW, CrV, or CrTi alloy layer, or the like is cited and, as the adhesive layer, an NiAl or AlRu alloy layer or the like is cited.

EXAMPLES

Hereinbelow, this invention will be described in further detail based on examples.

Example 1

FIG. 1 shows a magnetic disk 10 according to the embodiment of this invention.

The magnetic disk 10 is fabricated by forming a non-magnetic metal layer 2 composed of an adhesive layer 2a and an underlayer 2b, a magnetic layer 3, a carbon-based protective layer 4, and a lubricating layer 5 in the order named on a substrate 1.

(Manufacture of Magnetic Disk)

A 2.5-inch glass disk (outer diameter 65 mm, inner diameter 20 mm, disk thickness 0.635 mm) made of a chemically strengthened aluminosilicate glass was prepared as the disk substrate 1. The main surface of the disk substrate 1 was mirror-polished to Rmax of 4.8 nm and Ra of 0.43 nm.

On the disk substrate 1, the adhesive layer 2a, the underlayer 2b, and the magnetic layer 3 were formed in this order in an Ar gas atmosphere by the DC magnetron sputtering method.

As the adhesive layer 2a, an NiAl alloy film (Ni: 50 at %, Al: 50 at %) was formed to a thickness of 300 Å.

As the underlayer 2b, a CrMo alloy film (Cr: 80 at %, Mo: 20 at %) was formed to a thickness of 80 Å.

As the magnetic layer 3, a CoCrPtB alloy film (Co: 62 at %, Cr: 20 at %, Pt: 12 at %, B: 6 at %) was formed to a thickness of 150 Å.

Subsequently, sputtering was carried out using a carbon target in an atmosphere of a mixed gas of an Ar gas and a hydrogen gas (hydrogen gas content 30%) by the DC magnetron sputtering method, thereby forming the protective layer 4 of hydrogenated carbon to a thickness of 25 Å.

Then, the lubricating layer was formed in the following manner.

There was prepared a solution in which a lubricant (Mn measured by the NMR method was 4000 and the molecular weight dispersion was 1.25) comprising a phosphazene compound of this invention (the illustrative compound (4)) having been subjected to molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.02 wt %. Using this solution as a coating solution, the substrate formed with the layers up to the protective layer 4 was immersed therein and coated therewith by the dipping method, thereby forming the lubricating layer 5.

After the film formation, the magnetic disk 10 was heat-treated in a vacuum furnace at 130° C. for 90 minutes, thereby adhering the lubricating layer 5 to the protective layer 4. The thickness of the lubricating layer 5 was measured by a Fourier transform infrared spectrophotometer (FTIR) and it was 10 Å. In this manner, the magnetic disk of this Example was obtained.

Then, an evaluation of the magnetic disk of this Example was performed according to the following test method.

(Evaluation of Magnetic Disk)

At first, a lubricating layer adhesion test was performed for evaluating the bonding performance (adhesion) of the lubricating layer with respect to the protective layer. At first, the thickness of the lubricating layer of the magnetic disk of this Example was measured by the FTIR method and it was 10 Å as described above. Then, the magnetic disk of this Example was immersed in the fluorine-based solvent Vertrel XF for 1 minute. By the immersion in the solvent, portions of the lubricating layer with poor adhesion are dispersed and dissolved in the solvent, but portions with strong adhesion can remain on the protective layer. Then, the magnetic disk was removed from the solvent and the thickness of the lubricating layer was measured again by the FTIR method. The ratio of the thickness of the lubricating layer after the immersion in the solvent to the thickness of the lubricating layer before the immersion in the solvent is called a lubricating layer adhesion ratio (bonded ratio). It can be said that the higher the bonded ratio, the higher the bonding performance of the lubricating layer with respect to the protective layer. With the magnetic disk of this Example, the bonded ratio was 92%. Since the bonded ratio is judged to be preferable if it is 70% or more, it is seen that the magnetic disk of this Example is excellent in bonding performance of the lubricating layer.

Then, a lubricating layer coverage ratio evaluation was performed.

The coverage ratio of the lubricating layer was measured by the X-ray photoelectron spectroscopy known from U.S. Pat. No. 6,099,981. As the lubricating layer coverage ratio is higher, it represents that the surface of the magnetic disk is coated with the lubricating layer more uniformly, and thus the head crash failure or the corrosion failure can be suppressed. That is, as the lubricating layer coverage ratio is higher, the surface of the magnetic disk is more protected with a smaller exposure degree of the surface of the protective layer and, therefore, the lubricating performance of the surface of the magnetic disk is higher and, further, it is possible to protect the surface of the magnetic disk from substances that tend to cause the corrosion failure or the fly stiction failure, such as acid-based contaminants present in an atmosphere inside a magnetic disk apparatus or siloxane-based contaminants. With the magnetic disk of this Example, the lubricating layer coverage ratio was 98%. Since the lubricating layer coverage ratio is judged to be preferable if it is 90% or more, it is seen that the magnetic disk of this Example is high in lubricating layer coverage ratio and exhibits the preferable properties.

Then, an LUL (Load Unload) durability test was performed for examining the LUL durability of the obtained magnetic disk.

An LUL-system HDD (Hard Disk Drive) (5400 rpm rotation type) was prepared and a magnetic head with a flying height of 10 nm and the magnetic disk were mounted therein. A slider of the magnetic head is an NPAB slider and is mounted with a magnetoresistive effect element (GMR element) as a reproducing element. A shield portion is made of an FeNi-based permalloy alloy. By causing the LUL-system HDD to continuously repeat the LUL operations, the number of LUL times endured by the magnetic disk up to the occurrence of failure was measured.

As a result, the magnetic disk of this Example endured the LUL operations of 900,000 times with no failure at a very low flying height of 10 nm. In a normal HDD using environment, use for about 10 years is generally required for the number of LUL times to exceed 400,000 times. Since a magnetic disk is judged to be preferable if it endures particularly 600,000 times or more, it can be said that the magnetic disk of this Example has extremely high reliability.

The surface of the magnetic disk after the LUL durability test was observed in detail using an optical microscope and an electron microscope and was found to be excellent, i.e. no abnormality such as damage or dirt was observed. Further, the surface of the magnetic head after the LUL durability test was examined in detail using an optical microscope and an electron microscope and was found to be excellent, i.e. no abnormality such as damage or dirt was observed and, further, no lubricant adhesion to the magnetic head or no corrosion failure was observed.

Then, a fly stiction test was performed. 100 magnetic disks of this Example were manufactured and, by performing a glide test using a glide head with a flying height of 5 nm, the test was performed to see whether or not the fly stiction phenomenon occurred. When the fly stiction phenomenon occurs, the flying posture of the glide head suddenly becomes abnormal and, therefore, by monitoring a signal of a piezoelectric element bonded to the glide head, the occurrence of fly stiction can be detected. As a result, with the magnetic disks of this Example, the fly stiction phenomenon did not occur and the pass rate of the test was 100%.

For evaluating the thermal properties, the LUL durability test and the fly stiction test were performed in atmospheres of −20° C. to 50° C. With the magnetic disks of this Example, no particular failure occurred and the good results were obtained.

The evaluation results of the magnetic disks of this Example are collectively shown in Table 1.

Example 2, Example 3

Magnetic disks of Example 2 were manufactured in the same manner as in Example 1 except that the illustrative compound (1) (Mn was 2500 and the molecular weight dispersion was 1.2) of this invention was used as a lubricant for a lubricating layer. Further, Magnetic disks of Example 3 were manufactured in the same manner as in Example 1 except that the illustrative compound (3) (Mn was 4000 and the molecular weight dispersion was 1.2) of this invention was used as a lubricant for a lubricating layer.

An evaluation of the magnetic disks were performed in the same manner as in Example 1 and excellent results were obtained both in Example 2 and in Example 3 like those in Example 1. The evaluation results are collectively shown in Table 1.

foregoing fluorine-based solvent Vertrel XF at a concentration of 0.02 wt %. Using this solution as a coating solution, a substrate formed with layers up to a protective layer 4 was immersed therein and coated therewith by the dipping method, thereby forming a lubricating layer 5. Magnetic disks manufactured in the same manner as in Example 1 except the above were used for Comparative Example 1.

Further, magnetic disks manufactured in the same manner as in Example 1 except that a lubricating layer was formed using only the above perfluoropolyether compound having hydroxyl groups as both terminal groups were used for Comparative Example 2.

An evaluation of the magnetic disks was performed in the same manner as in Example 1. The results are shown in Table 1 given above. The bonded ratio and the lubricating layer coverage ratio were low both in Comparative Example 1 and in Comparative Example 2. Further, in Comparative Example 1, failure occurred when the number of LUL times reached 200,000 times. Further, among tested HDDs, the fly stiction failure occurred in 80% HDDs (pass rate 20%). In Comparative Example 2, failure occurred when the number of LUL times reached 300,000 times. Further, among tested HDDs, the fly stiction failure occurred in 70% HDDs (pass rate 30%). After the test, magnetic heads were removed from the HDDs used in Comparative Examples and 2 and examined. Then, transfer of the lubricant and corrosion failure were confirmed at NPAB pocket portions and ABS surfaces of the magnetic heads and adhesion of dirt was confirmed on the surfaces of the magnetic disks.

TABLE 1

| Table 1 | lubricant | bonded ratio | covering ratio | molecular weight | LUL durability test number of endured times | disk surface | head surface | fly stiction test pass rate |
|---|---|---|---|---|---|---|---|---|
| Example 1 | illustrative compound (4) | 92% | 98% | 4000 | 900,000 times, endured | good | good | 100% no fly stiction |
| Example 2 | illustrative compound (1) | 89% | 96% | 2500 | 900,000 times, endured | good | good | 100% no fly stiction |
| Example 3 | illustrative compound (3) | 99% | 99% | 4000 | 900,000 times, endured | good | good | 100% no fly stiction |
| Comparative Example 1 | mixture of phosphazene + PFFE | 58% | 86% | — | after 200,000 times, failed | dirt adhered | head element & shield portion corroded, dirt adhered | 20% fly stiction occurred |
| Comparative Example 2 | only PFPE | 62% | 85% | 3700 | after 300,000 times, failed | dirt adhered | head element & shield portion corroded, dirt adhered | 30% fly stiction occurred |

Comparative Example 1, Comparative Example 2

In Comparative Example 1, there was prepared a solution in which a perfluoropolyether compound (Mn was 2800 and the molecular weight dispersion was 1.07) having phosphazene rings as terminal groups, represented by $R_1$—$OCH_2CF_2(OC_2F_4)_m(OCF_2)_n$ $OCF_2CH_2O$—$R_2$ ($R_1$ and $R_2$ are each a phosphazene ring and m and n are each an integer of 1 or more), and a perfluoropolyether compound (the above $R_1$ and $R_2$ are each a hydrogen atom) (Mn was 3700 and the molecular weight dispersion was 1.08) having hydroxyl groups as both terminal groups were mixed together at a weight ratio of 1:1 and dispersed and dissolved in the For evaluating the thermal properties, the LUL durability test and the fly stiction test were performed in atmospheres of −20° C. to 50° C. Then, failure occurred in all the magnetic disks of Comparative Example 1 and Comparative Example 2 and the degree of failure was large depending on the temperature of the atmosphere.

The invention claimed is:

1. A magnetic disk having a magnetic layer, a carbon-based protective layer, and a lubricating layer over a substrate, wherein:
    the magnetic disk is adapted to be mounted in a magnetic disk apparatus of a load unload system having a magnetic head flying height of 10 nm or less, and the lubricating layer contains a phosphazene compound represented by a general formula (I), the phosphazene compound having a phosphazene ring

[Formula 1]

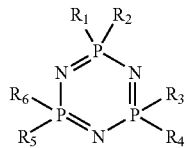

(in the formula, at least one of $R_1$ to $R_6$ is a group having a perfluoropolyether main chain represented by —(O—$C_2F_4$)m-(O—$CF_2$)n- (m and n are each an integer of 1 or more) and at least two carboxyl groups in the perfluoropolyether main chain, and the remaining of $R_1$ to $R_6$ are respectively fluorine-containing groups, and three or more carboxyl groups are present in one molecule of the phosphazene compound).

2. A magnetic disk according to claim 1, wherein a number-average molecular weight (Mn) of the phosphazene compound is 300 to 7000.

3. A magnetic disk according to claim 1, wherein m+n in the —(O—$C_2F_4$)m-(O—$CF_2$)n- falls within a range of 2 to 80.

* * * * *